United States Patent
Komiya

(10) Patent No.: US 7,093,167 B2
(45) Date of Patent: Aug. 15, 2006

(54) CONTROL APPARATUS AND SELF-DIAGNOSTIC METHOD FOR ELECTRONIC CONTROL SYSTEM

(75) Inventor: Motoki Komiya, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 686 days.

(21) Appl. No.: 10/293,558

(22) Filed: Nov. 14, 2002

(65) Prior Publication Data

US 2003/0105992 A1 Jun. 5, 2003

(30) Foreign Application Priority Data

Nov. 21, 2001 (JP) .......................... P2001-356136

(51) Int. Cl.
*G06F 11/00* (2006.01)
*G06F 11/30* (2006.01)

(52) U.S. Cl. ..................... 714/44; 714/22; 714/25; 713/340

(58) Field of Classification Search .............. 714/12, 714/22, 36, 44
See application file for complete search history.

(56) References Cited

U.S. PATENT DOCUMENTS

| 3,890,494 A | * | 6/1975 | Meshek et al. ............... 714/22 |
| 5,019,996 A | * | 5/1991 | Lee .............................. 702/60 |
| 5,555,269 A | | 9/1996 | Friday, Jr. et al. |
| 5,606,511 A | * | 2/1997 | Yach ............................. 702/64 |
| 6,735,720 B1 | * | 5/2004 | Dunn et al. .................... 714/43 |
| 6,898,732 B1 | * | 5/2005 | Trehus et al. ................. 714/11 |
| 2002/0062460 A1 | * | 5/2002 | Okuda ........................... 714/25 |

FOREIGN PATENT DOCUMENTS

| CN | 1053037 C | 5/2000 |
| JP | A 9-282028 | 10/1997 |
| KR | 1999-005409 | 1/1999 |
| KR | 2001-0083734 | 9/2001 |

* cited by examiner

*Primary Examiner*—Scott Baderman
*Assistant Examiner*—Joseph Schell
(74) *Attorney, Agent, or Firm*—Oliff & Berridge, PLC

(57) ABSTRACT

A control apparatus to which plural power devices are connected via a communication line. The power devices send data indicating a self-diagnostic result to the control apparatus by serial communications via the communication line. A CPU ignores serial communication data when a low-voltage detection circuit detects an abnormal drop in power source voltage. A period for ignoring data is set to time at which a completion of serial communication with all the power devices is determined by counting the number of communications by a counter. Even in case where an influence by the drop in power source voltage remains after recovery of the power source voltage due to communication delay, data that may includes abnormality is ignored and only self-diagnostic data with high reliability is used.

5 Claims, 11 Drawing Sheets

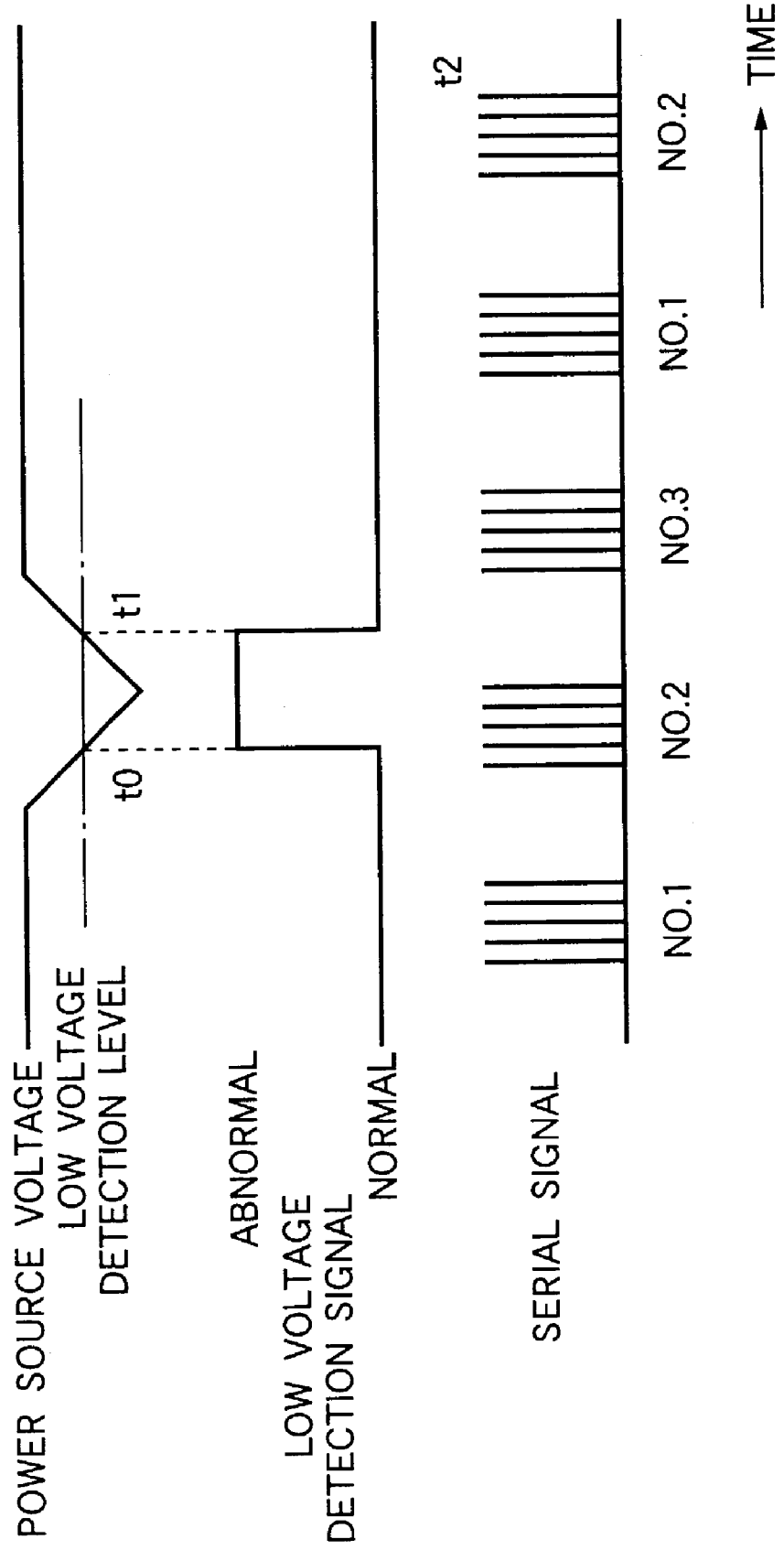

CONTROL APPARATUS AND SELF-DIAGNOSTIC METHOD FOR ELECTRONIC CONTROL SYSTEM

The present disclosure relates to the subject matter contained in Japanese Patent Application No. 2001-356136 filed Nov. 21, 2001, which is incorporated herein by reference in its entirety.

BACKGROUND OF THE INVENTION

1. Field of the Invention

The present invention relates to a control apparatus for conducting serial communication with a plurality of electronic devices thereby constitutes an electronic control system, and a self-diagnostic method in the electronic control system.

2. Description of the Related Art

Conventionally, a configuration as shown in FIG. 11 is used in various control. In a field so-called mechatronics, for example, a plurality of power devices 1, 2, 3 of No.1 to No.3 are used for driving various actuators by electronic control. Each power device 1, 2, 3 can pass a current to a motor or a solenoid to generate driving force, or pass a current to a heater to generate heat. Such an electronic control system 10 is controlled by a program operation by a CPU 12 of a control apparatus 11. Connections between the control apparatus 11 and the power devices 1, 2, 3 are made through a communication line 13. In case in which each power device 1, 2, 3 drive an actuator by a large current of, for example, several amperes or more, the power devices 1, 2, 3 are placed in the vicinity of the actuator and are separated from the control apparatus 11. The power devices 1, 2, 3 maybe integrated with the control apparatus 11 or placed close to the control apparatus 11, but this causes that each power device 1, 2, 3 is distant from the actuator and a driving output of a large current is sent over a long distance. In case in which connections between the control apparatus 11 and the power devices 1, 2, 3 in a distant position are made through the communication line 13 and data necessary for control is transmitted by serial communication, the number of communication lines 13 can be reduced.

In order to perform control with high reliability by the electronic control system 10 shown in FIG. 11, there may be provided a function of performing self-diagnosis for determining whether or not an abnormal operation is occurring before each power device 1, 2, 3 actually drives and controls the actuator or in a proper timing during the control. For example, in the electronic control system 10 which is mounted in an automobile and performs various control, a self-diagnostic result is sent from each power device 1, 2, 3 to the control apparatus 11 through serial communication and the whole self-diagnosis or operation monitoring of the electronic control system 10 is performed by the control apparatus 11. The electronic control system 10 mounted in an automobile is operated by receiving electric power supply from a power source system of the automobile. At a time of an abnormal drop in power source voltage, a reliable operation cannot be performed. As a measure to this, a low-voltage detection circuit 14 is provided and a preset fail-safe operation is performed when the abnormal drop in power source voltage supplied from a battery 15 is detected.

As shown in FIG. 12, when the power source voltage drops abnormally and becomes less than or equal to a low-voltage detection level set in the low-voltage detection circuit 14 at time t0, the low-voltage detection circuit 14 gives a low-voltage detection signal, which indicates that the power source voltage drops abnormally, to the CPU 12 At this time, if the control apparatus 11 is receiving data about a self-diagnostic result from the power device No.2 through the communication line 13, subsequently, data from the power device No.3 and data from the power device No.1 are sequentially received. Since the data from the power device No.2 is received when the low-voltage detection signal indicates abnormal state, there is a possibility that a self-diagnostic function performs wrong detection. Thus, the data from the power device No.2 is cleared. When the power source voltage recovers to the low-voltage detection level or more at time t1, the low-voltage detection signal changes to indicate a normal state.

JP-A-9-282028 discloses a self-diagnosis about the electronic control system. This prior art discloses an idea for performing a self-diagnosis by varying a power source to determine whether or not an input device such as a sensor has failed.

In the configuration shown in FIG. 11, even when an abnormal drop in power source voltage is detected and data indicating a self-diagnostic result received by serial communication is made invalid during occurrence of abnormality, it takes time to complete sending the data, which may includes wrong detection affected by the power source voltage abnormality and is sent from all the power devices 1, 2, 3, due to a sending delay. Thus, even when the low-voltage detection signal returns from abnormal state to normality state subsequent to time t1, there is a possibility that abnormal data is received in the control apparatus 11, causing harm to self-diagnosis of the electronic control system 10.

SUMMARY OF THE INVENTION

An object of the invention is to provide a control apparatus capable of using data such as a self-diagnostic result with high reliability even in case that a disturbance factor such as an abnormal drop in power source voltage occurs, and a self-diagnostic method in an electronic control system.

According to an aspect of the invention, there is provided a control apparatus to which a plurality of electronic devices are connected via a communication line and data sent from each of the electronic devices is received by serial communication, comprising: condition setting means for presetting a condition corresponding to a period necessary to receive data by the serial communication from the electronic devices; disturbance detection means for detecting a disturbance factor presumed to cause an abnormal operation in at least one of the electronic devices; and data processing means for ignoring data from the electronic devices for a period of time when the disturbance detection means detects the disturbance factor until the condition set in the condition setting means is satisfied.

According to the invention, a control apparatus receives data sent from plural electronic devices connected via a communication line by serial communication, and includes condition setting means, disturbance detection means and data processing means. A condition corresponding to a period necessary to receive data by the serial communication from the plural electronic devices is preset in the condition setting means. The disturbance detection means detects a disturbance factor presumed to cause an abnormal operation in at least one of the electronic devices. When the disturbance detection means detects the disturbance factor, the data processing means ignores data from the plural electronic devices for a period by which the condition set in the condition setting means is satisfied. A period for which data is ignored since there is no reliability of data sent by the serial communication from the electronic devices when the disturbance factor occurs is set corresponding to a period necessary to receive data by the serial communication from the plural electronic devices, so that data in which there is a possibility that an abnormal operation occurs is ignored properly and only the data with high reliability can be used. Detection of the disturbance factor is performed by the disturbance detection means of the control apparatus, so that the detection can be used in common with each of the electronic devices and a configuration of an electronic control system structured by the control apparatus and the plural electronic devices can be simplified to achieve cost reduction.

According to another aspect of the invention, a completion of a predetermined number of serial communications is set as the condition in the condition setting means, the predetermined number corresponds to the number of electronic devices connected via the communication line.

According to the invention, even in case of receiving data, in which there is a possibility that an influence of the disturbance factor is suffered, from all the electronic devices by serial communication, the received data is ignored, so that data with low reliability can be eliminated surely.

According to another aspect of the invention, a lapse of time necessary for serial communications with all the electronic devices connected via the communication line is set as the condition in the condition setting means.

According to the invention, data communicated in serial is ignored until the time necessary for serial communications with all the electronic devices elapses, so that an operation for ignoring data with low reliability can be performed by a simple determination on whether or not the time has elapsed.

According to another aspect of the invention, the condition setting means prolongs the time in accordance with an increase of the disturbance factor detected by the disturbance detection means.

According to the invention, as the disturbance factor increases, a period for which data communicated in serial is ignored is also prolonged, so that the period for which data is ignored can be set properly according to the extent of disturbance.

Further, there is provided a self-diagnostic method for an electronic control system including a control apparatus and a plurality of electronic devices connected to the control apparatus via a communication line and sending data that indicates a self-diagnostic result thereof to the control apparatus by serial communication, the method comprising: detecting a drop in power source voltage; and ignoring the data that indicates a self-diagnostic result for a preset period of time corresponding to a time necessary for serial communications from the electronic devices to the control apparatus.

According to the invention, plural electronic devices are connected to a control apparatus to constitute an electronic control system. Data indicating a self-diagnostic result is sent from each of the electronic devices to the control apparatus by serial communication. When a drop in power source voltage is detected in the case that the control apparatus receives the data, the data is ignored for a period set corresponding to a period necessary for serial communication, so that the self-diagnostic result in which there is a possibility that abnormal data is included is eliminated and only data of the self-diagnostic result with high reliability can be used.

BRIEF DESCRIPTION OF THE DRAWINGS

FIG. 12 is a time chart showing an operation at a time when a drop in power source voltage occurs during self-diagnosis in the conventional electronic control system.

DETAILED DESCRIPTION OF THE PREFFERED EMBODIMENTS

Figure 1:
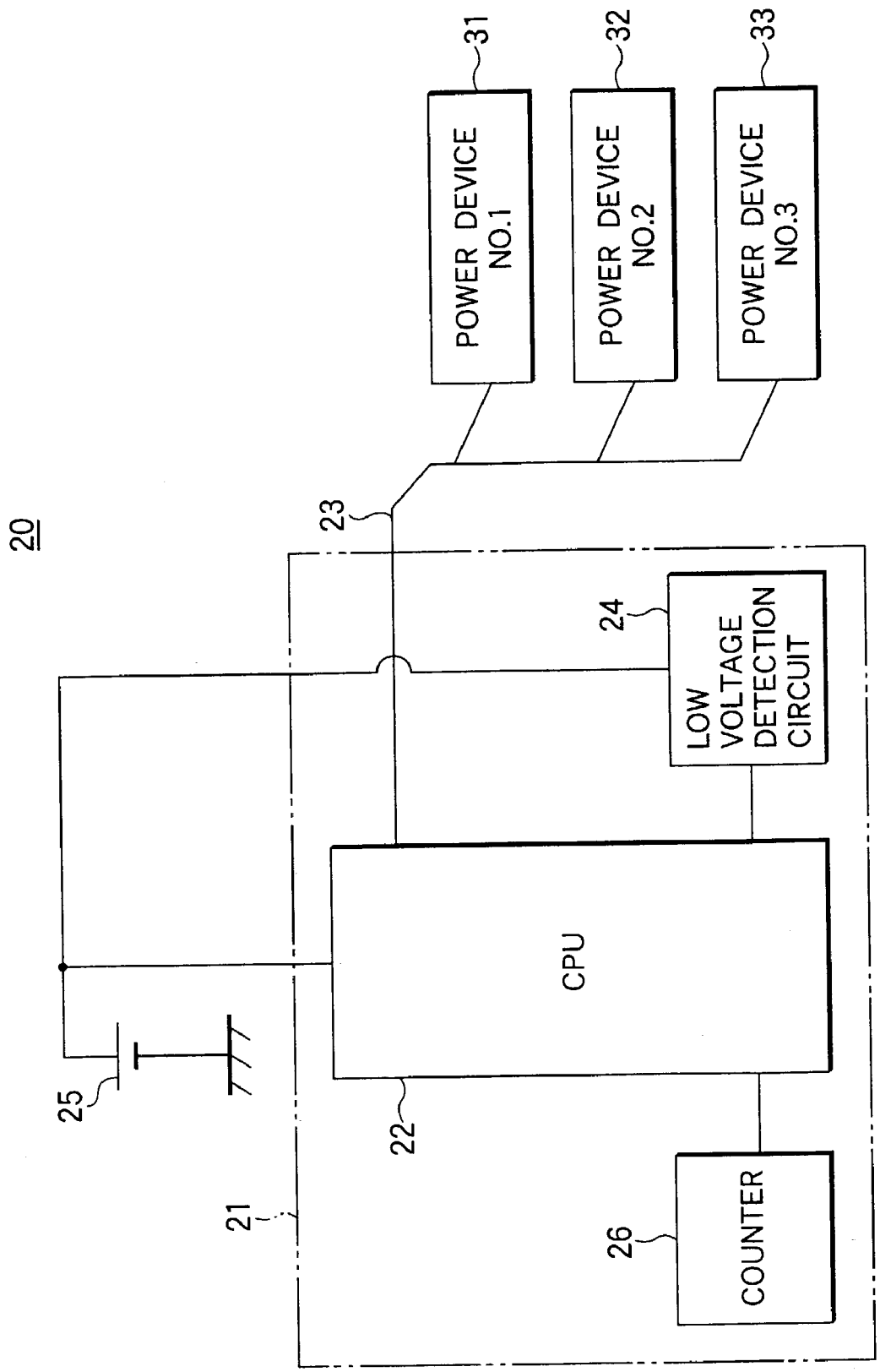
FIG. 1 is a block diagram showing a schematic electrical configuration of an electronic control system according to a first embodiment of the invention.

FIG. 1 shows a schematic electrical configuration of an electronic control system 20 according to a first embodiment of the invention. This electronic control system 20 is mounted in, for example, an automobile, and performs various control. A CPU 22 of a control apparatus 21 performs processing for the control according to a program preset in a ROM (not shown) According to a control result, data for driving various actuators is sent and received by serial communication through a communication line 23. Since the serial communication is used, a configuration of the communication line 23 can be simplified. In the control apparatus 21, a drop in power source voltage is detected as a disturbance factor having an influence on the control. The drop in power source voltage is detected by a low-voltage detection circuit 24. In this embodiment, when a drop in voltage supplied from a power source such as a battery 25 is detected, the number of data received by the serial communication is counted by a counter 26.

The serial communication through the communication line 23 is conducted between the control apparatus 21 and a plurality of electronic devices, for example, three power devices 31, 32, 33 of No.1 to No.3. The counter 26 performs counting in accordance with the number of reception of the data indicating a self-diagnostic result from each of the power devices 31, 32, 33.

Figure 2:
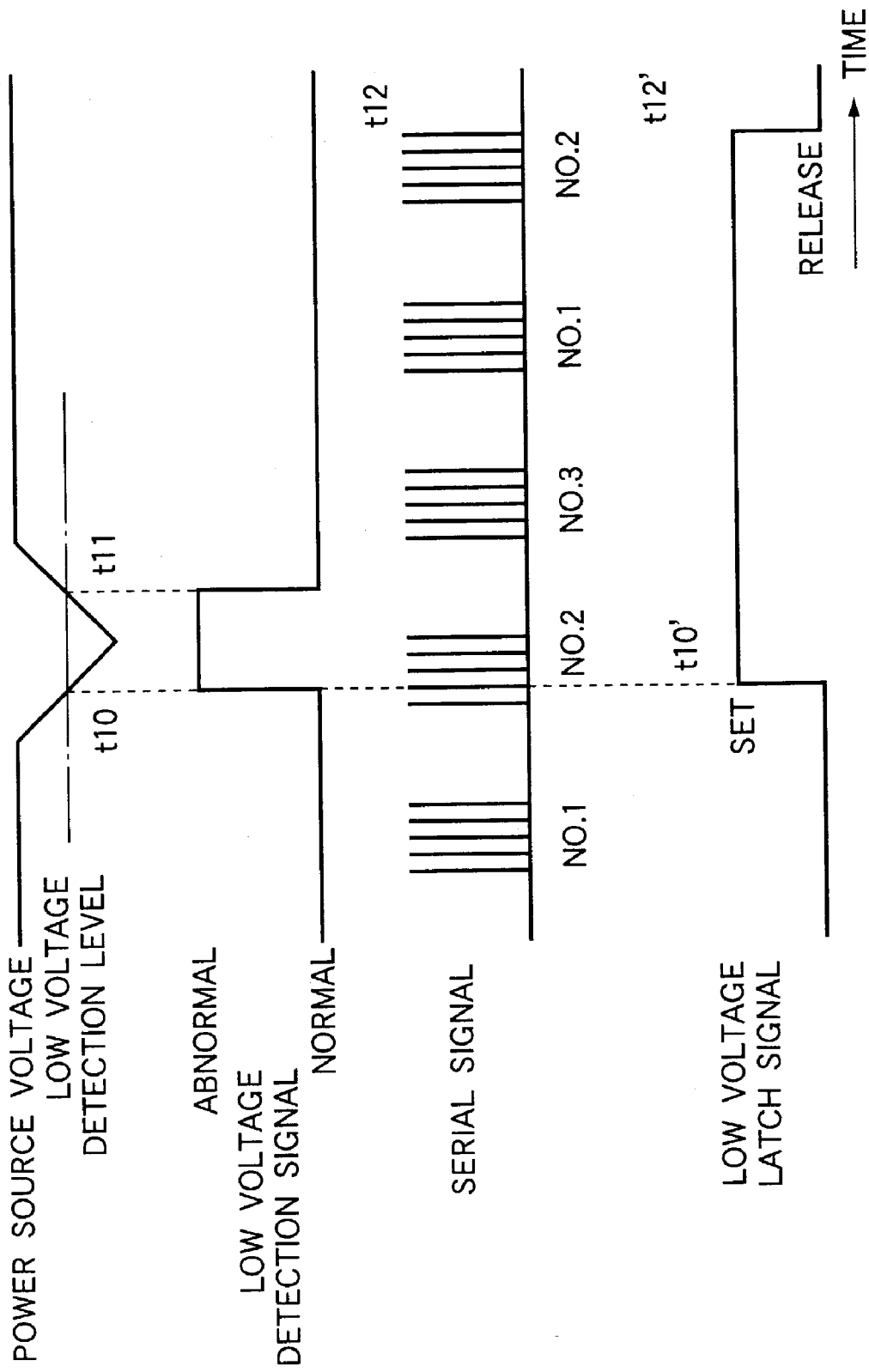
FIG. 2 is a time chart showing an operation at a time when a drop in power source voltage occurs during self-diagnosis in the first embodiment.

As shown in FIG. 2, in this embodiment, data indicating the self-diagnostic result from the three power devices 31, 32, 33 is sequentially received as a serial signal. Such a self-diagnostic operation is performed at predetermined timings such as at the time of starting of the entire electronic control system 20 or during operation. For example, the CPU 22 sequentially sends ID numbers of the predetermined power devices and control values to each of the power devices 31, 32, 33, and each of the power devices 31, 32, 33 receives these and returns a self-diagnostic result to the CPU 22. Data of the self-diagnostic result is sequentially sent by each of the power devices 31, 32, 33 and is repeated plural times as a whole. During such self-diagnosis, when a power source voltage drops abnormally and becomes a low-voltage detection level or less, the low-voltage detection circuit 24 gives a low-voltage detection signal indicating abnormality to the CPU 22. A time at which the power source voltage becomes the low-voltage detection level or less is set to t10. At that time the CPU 22 latches the low-voltage detection signal and sets a latch subsequent to time t10' and shifts up a low-voltage latch signal. In this embodiment, even when the power source voltage recovers to the low-voltage detection level or more at time t11 and thereby the low-voltage detection circuit 24 returns the low-voltage detection signal to normal state, the number of serial communications with the power devices 31, 32, 33 is counted by the counter 26. The latch is released at time t12' subsequent to time t12 at which serial communications with all the power devices 31, 32, 33 are completed at least once, and data is ignored until the low-voltage latch signal is shifted down. The latch can be set in, for example, a register of the CPU 22 or work memory such as a RAM (not shown) in the CPU 22.

Figure 3:
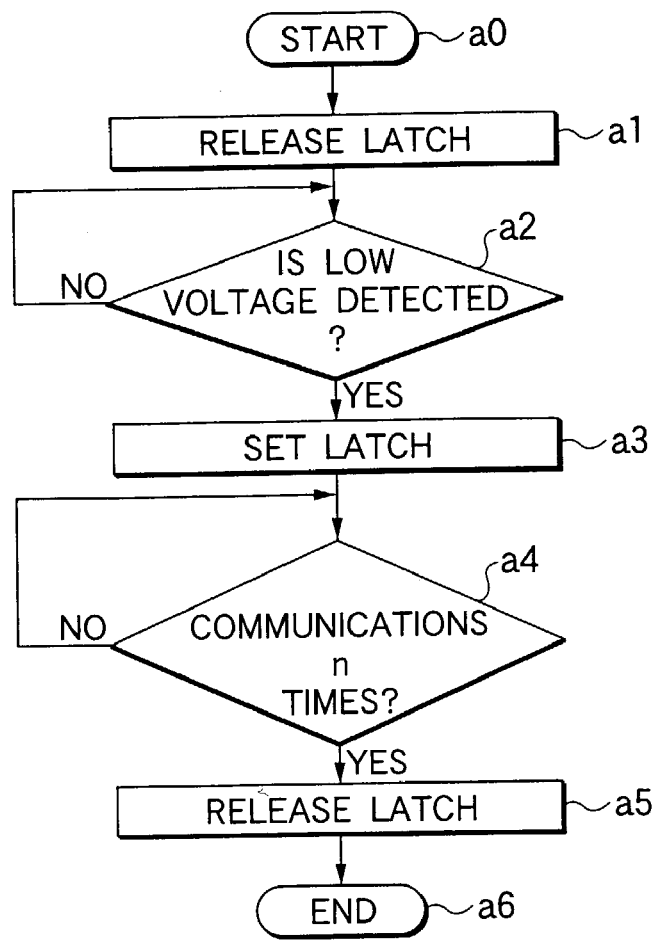
FIG. 3 is a flowchart showing a control procedure for coping with a drop in power source voltage during self-diagnosis in the first embodiment.

FIG. 3 shows an operation for monitoring a drop in voltage during serial communication conducted for self-diagnosis in the embodiment. An operation is started from step a0 and in step a1, a latch is released. In step a2, it waits for the low-voltage detection circuit 24 to detect low voltage. When the low voltage is detected, the latch is set in step a3. When the latch is set, it waits for the counter 26 to count the number of serial communications by the number n of power devices 31, 32, 33 in step a4. When communications n times are ended, the latch is released in step a5 and the operation is ended in step a6. Incidentally, setting of the latch corresponds to the shift up of the low-voltage latch signal shown in FIG. 2, and release of the latch corresponds to the shift down.

Figure 4:
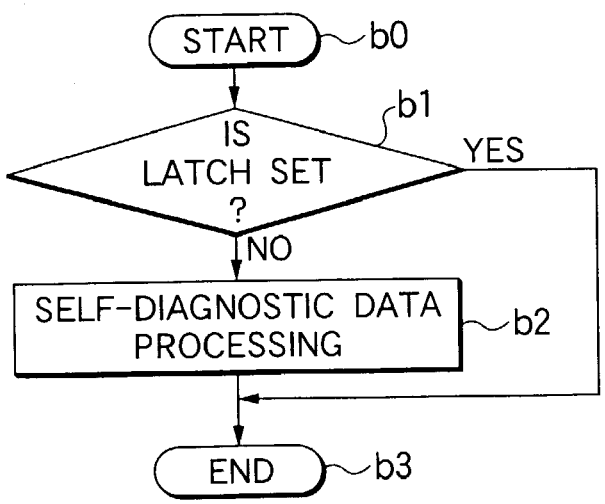
FIG. 4 is a flowchart showing a procedure for ignoring self-diagnostic data during latch setting in the first embodiment.

FIG. 4 shows a procedure of determination whether or not self-diagnostic data received from each of the power devices 31, 32, 33 should be used, using the latch set in FIG. 3. For example, by an interruption by receiving data through serial communication, a procedure is started from step b0. In step b1, it is judged whether a latch is set or not. When it is judged that the latch is not set, processing using self-diagnostic data received in step b2 is performed. When it is judged that the latch is set in step b1, the received self-diagnostic data is ignored. When step b2 is ended or the self-diagnostic data is ignored in step b1, the procedure is ended in step b3. Such a procedure is performed similarly in other embodiments described below.

Figure 5:
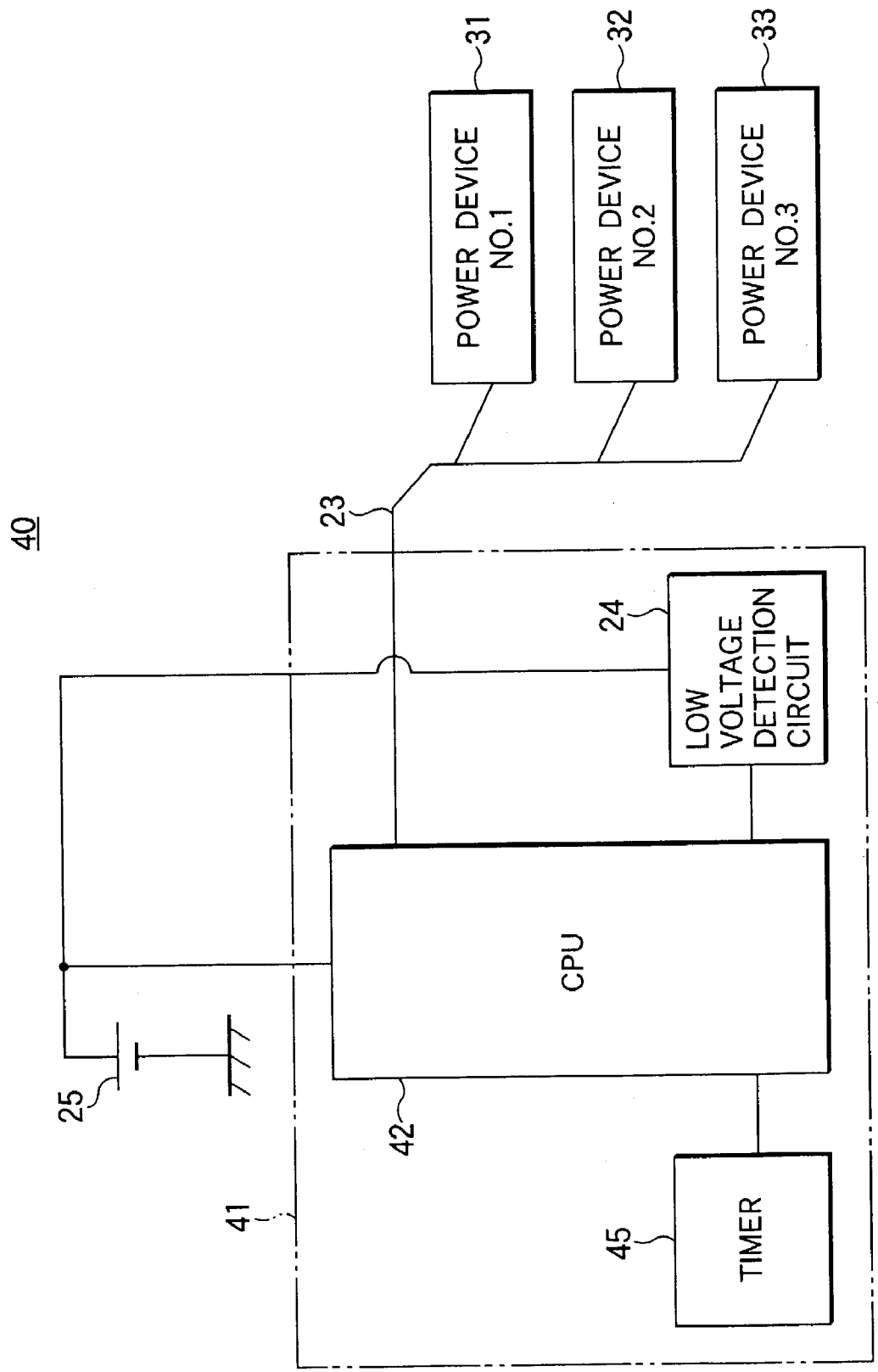
FIG. 5 is a block diagram showing a schematic electrical configuration of an electronic control system according to a second embodiment of the invention.

FIG. 5 shows a schematic electrical configuration of an electronic control system 40 according to a second embodiment of the invention. In this embodiment, the same reference numerals are attached to parts corresponding to the embodiment of FIG. 1 and overlap description is omitted. In the electronic control system 40 of the embodiment, a CPU 42 of a control apparatus 41 operates according to a preset program. A timer 45 is provided instead of the counter 26 of FIG. 1. When a drop in power source voltage is detected in a low-voltage detection circuit 24, constant time is set in the timer 45 and for a period of this time, self-diagnostic data by serial communication is ignored.

Figure 6:
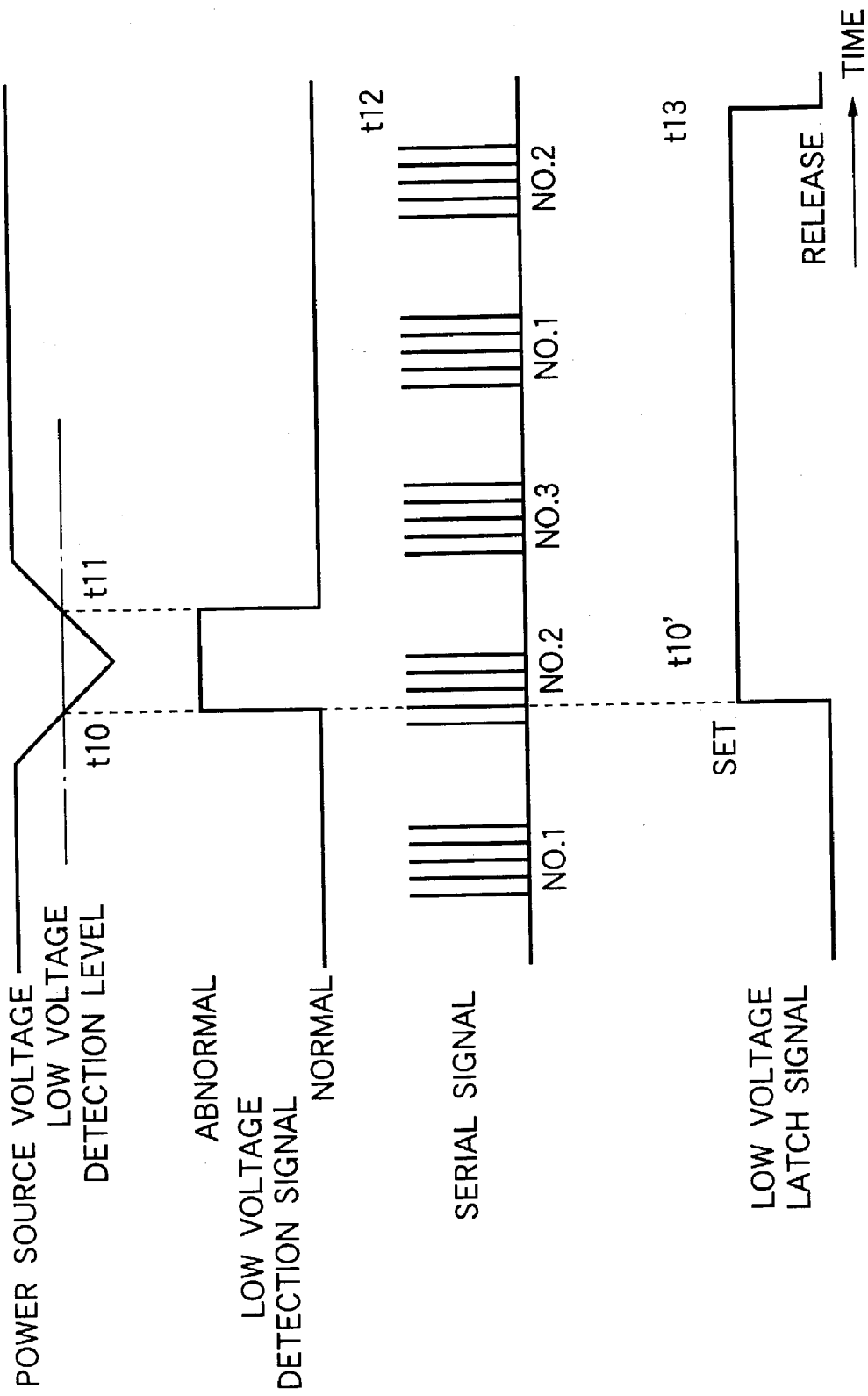
FIG. 6 is a time chart showing an operation at a time when a drop in power source voltage occurs during self-diagnosis in the second embodiment.

As shown in FIG. 6, in a manner similar to the embodiment of FIG. 1, data indicating the self-diagnostic result from three power devices 31, 32, 33 is sequentially received as a serial signal. During such self-diagnosis, when a power source voltage drops abnormally and becomes a low-voltage detection level or less, the low-voltage detection circuit 24 gives a low-voltage detection signal indicating abnormality to the CPU 42. A time at which the power source voltage becomes the low-voltage detection level or less is set to t10. At that time, the CPU 42 latches the low-voltage detection signal and sets a latch subsequent to time t10' and shifts up a low-voltage latch signal. In this embodiment, a constant time is set in the timer 45. Even when the power source voltage recovers to the low-voltage detection level or more at time t11 and thereby the low-voltage detection circuit 24 returns the low-voltage detection signal to normal state, data is ignored until time t13 at which the timer 45 clocks the constant time. The constant time set in the timer 45 is set so that the time elapses at a time t12 at which serial communications with all the power devices 31, 32, 33 are completed once, or thereafter.

In this embodiment, the constant time is set in the timer 45 and wait for a lapse of the constant time. In case in which communications of the electronic control system 40 is conducted in a constant cycle, the constant cycle can be set as the constant time, thereby a software for control can be simplified.

Figure 7:
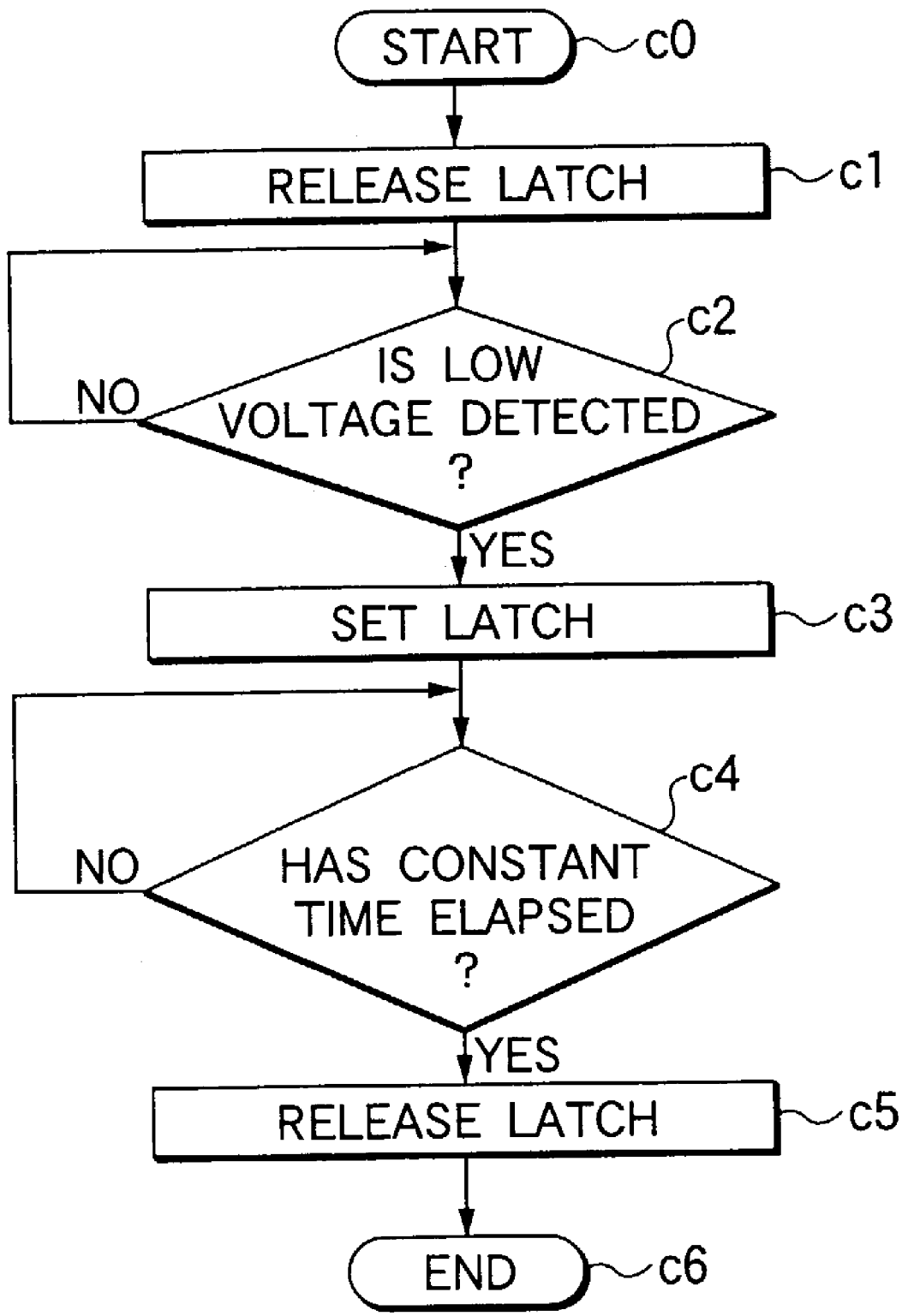
FIG. 7 is a flowchart showing a control procedure for coping with a drop in power source voltage during self-diagnosis in the second embodiment.

FIG. 7 shows an operation for monitoring a drop in voltage during serial communication conducted for self-diagnosis in the embodiment. An operation is started from step c0 and in step c1, a latch is released. In step c2, it waits for the low-voltage detection circuit 24 to detect low voltage. When the low voltage is detected, the latch is set in step c3. When the latch is set, in step c4, time longer than or equal to time necessary for serial communications with all the power devices 31, 32, 33 are completed once is set in the timer 45 and it waits for a lapse of that time. When the time set in the timer 45 has elapsed, the latch is released in step c5 and the operation is ended in step c6.

Figure 8:
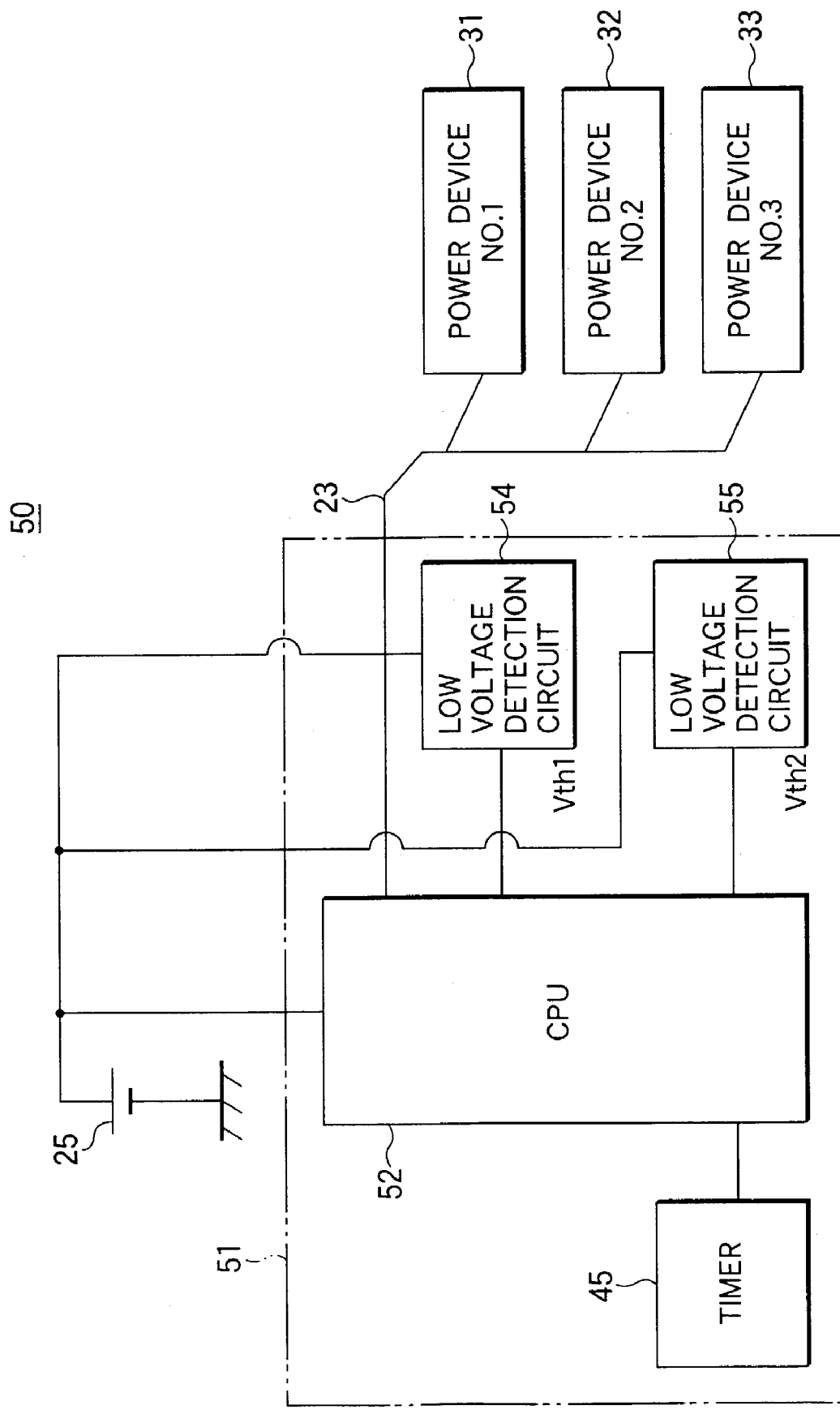
FIG. 8 is a block diagram showing a schematic electrical configuration of an electronic control system according to a third embodiment of the invention.

FIG. 8 shows a schematic electrical configuration of an electronic control system 50 according to a third embodiment of the invention. In this embodiment, the same reference numerals are attached to parts corresponding to the embodiment of FIG. 1 or FIG. 5 and overlap description is omitted. In the electronic control system 50 of the embodiment, a CPU 52 of a control apparatus 51 operates according to a preset program. Two low-voltage detection circuits 54, 55 are provided instead of the low-voltage detection circuit 24 of FIGS. 1 and 5. It is constructed so that different low-voltage detection levels are set in the two low-voltage detection circuits 54, 55 and different constant time is set in a timer 45 when each of the detection circuits detects a drop in power source voltage.

Figure 9:
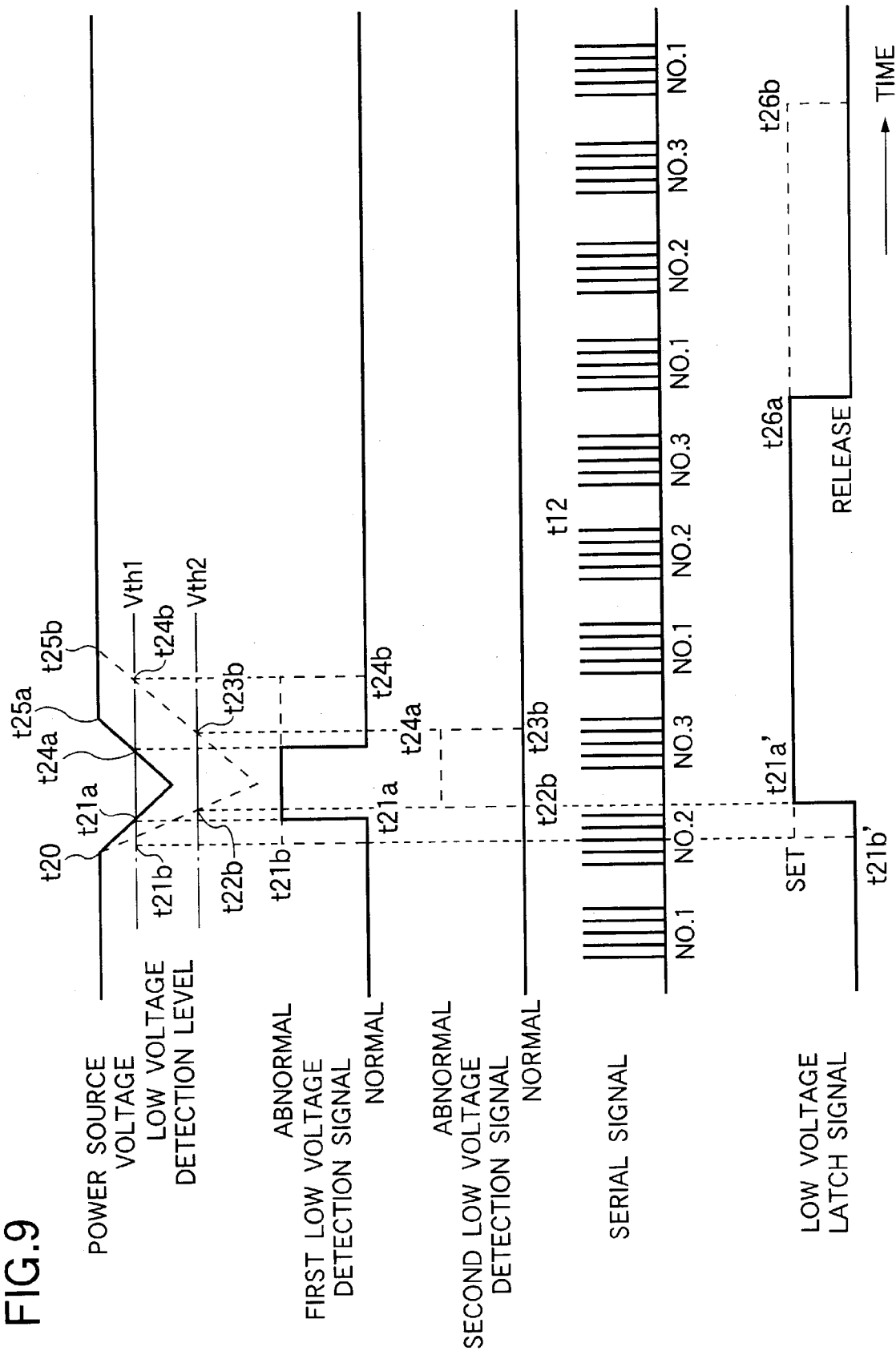
FIG. 9 is a time chart showing an operation at a time when a drop in power source voltage occurs during self-diagnosis in the third embodiment.

As shown in FIG. 9, in a manner similar to the embodiments of FIGS. 1 and 5, data indicating the self-diagnostic result from three power devices 31, 32, 33 is sequentially received as a serial signal. During such self-diagnosis, as shown by a solid line, when a power source voltage drops abnormally and becomes a first low-voltage detection level Vth1 or less, the low-voltage detection circuit 54 gives a first low-voltage detection signal indicating abnormality to the CPU 52. As shown by a broken line, when the power source voltage drops further and becomes less than or equal to a second low-voltage detection level Vth2 lower than the first low-voltage detection level Vth1, the low-voltage detection circuit 55 gives a second low-voltage detection signal indicating abnormality to the CPU 52. Incidentally, when the low-voltage detection circuit 55 generates the second low-voltage detection signal, the first low-voltage detection signal is also generated from the low-voltage detection circuit 54.

The power source voltage starts a drop from time t20 and becomes the first low-voltage detection level Vth1 or less at time t21a as shown by the solid line. At that time, the first low-voltage detection signal changes from normal state to abnormal state. A low-voltage latch signal is set at time t21a' after the time t21a. Time necessary for one round of serial communications with all the power devices 31, 32, 33 is set in the timer 45. When the power source voltage recovers to the first low-voltage detection level Vth1 or more at time t24a, the first low-voltage detection signal recovers from abnormal state to normal state. The power source voltage shall return to normal voltage, for example, subsequent to time t25a. The low-voltage latch signal is released at time t26a at which the time set in the timer 45 is expired. Self-diagnostic data by serial communication is ignored while the low-voltage latch signal is set.

As shown by the broken line, the power source voltage dropping from the time t20 and becomes the first low-voltage detection level Vth1 or less at time t21b and the first low-voltage detection signal changes from normal state to abnormal state, and further becomes the second low-voltage detection level Vth2 or less at time t22b and the second low-voltage detection signal also changes from normal state to abnormal state. When the power source voltage recovers to the second low-voltage detection level Vth2 or more at time t23b, the second low-voltage detection signal changes from abnormal state to normal state. When the power source voltage recovers to the first low-voltage detection level Vth1 or more at time t24b, the first low-voltage detection signal also changes from abnormal state to normal state. The power source voltage returns to normal voltage subsequent to time t25b.

A low-voltage latch signal is first set at time t21b' after the time t21b, and time necessary for one round of serial communications with all the power devices 31, 32, 33 is set in the timer 45. After the time t22b, longer time is set to the timer. This time may be set to a time which is twice or more the time necessary for one round of serial communications with all the power devices 31, 32, 33. That is, time necessary for two or more rounds of the serial communications. As a result of this, as shown by a broken line, the low-voltage latch signal is released at time t26b after the serial communications make two rounds or more. The time for which self-diagnostic data is ignored is prolonged according to the extent of a drop in the power source voltage.

Figure 10:
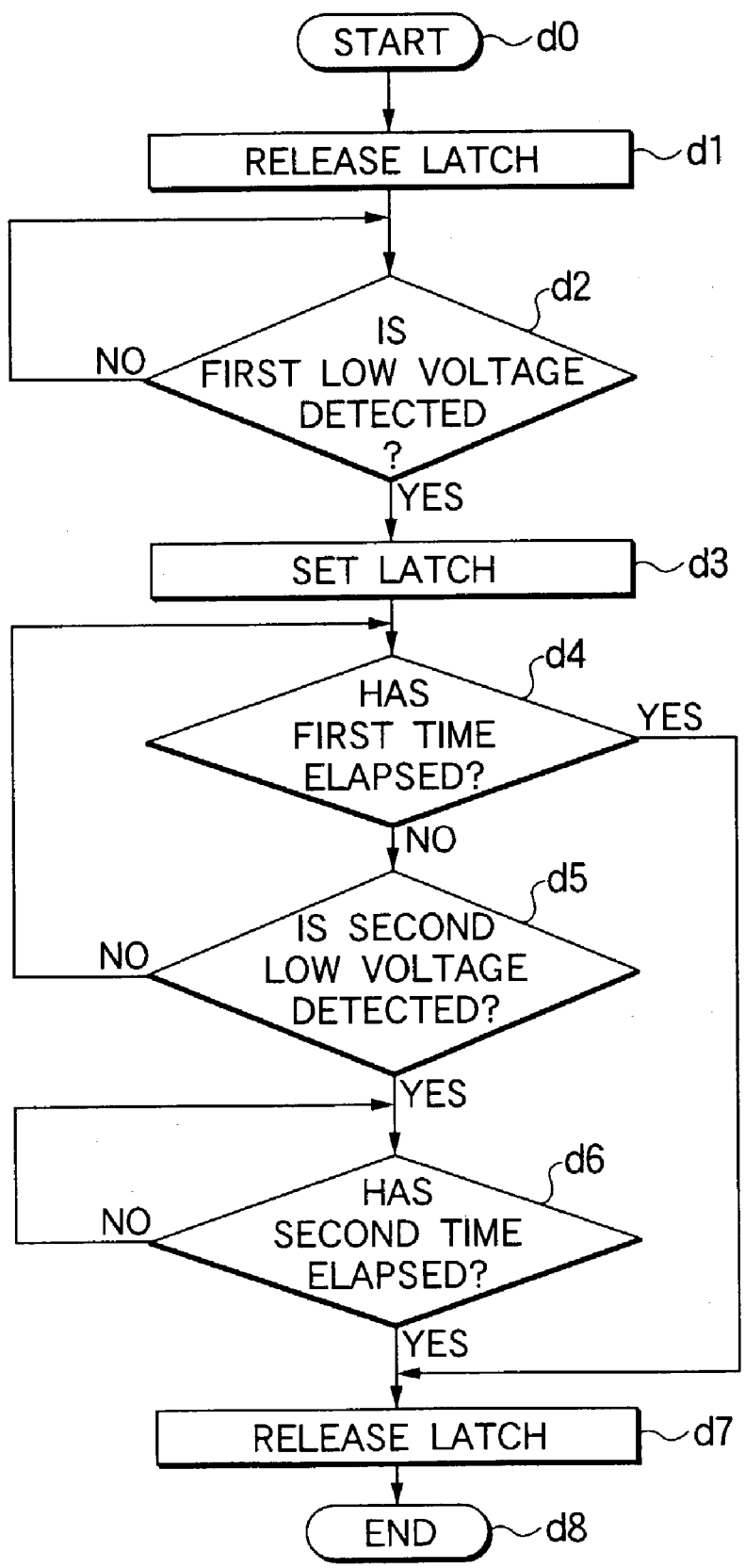
FIG. 10 is a flowchart showing a control procedure for coping with a drop in power source voltage during self-diagnosis in the third embodiment.
Figure 11:
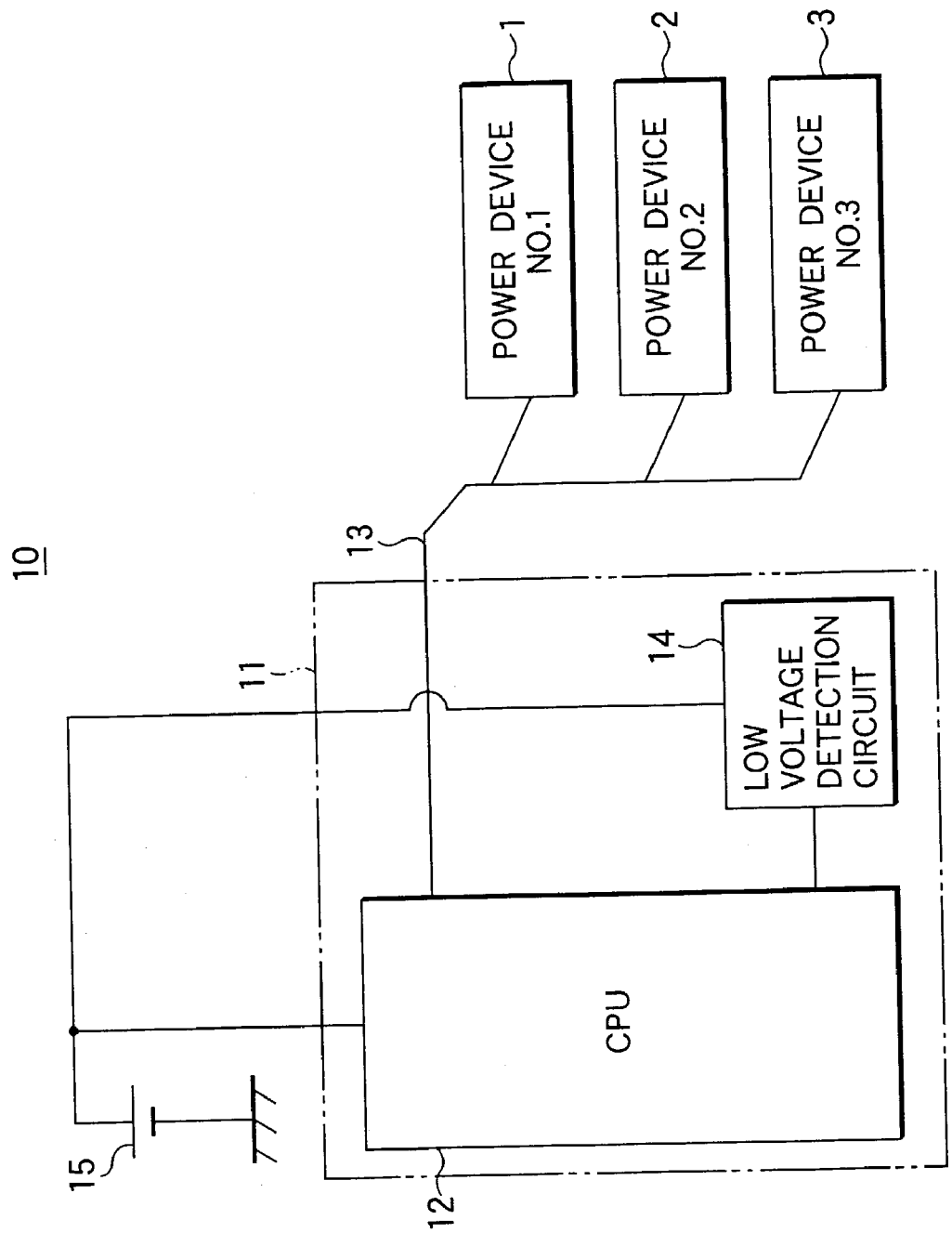
FIG. 11 is a block diagram showing a schematic electrical configuration of a conventional electronic control system.

FIG. 10 shows an operation for monitoring a drop in voltage during serial communication conducted for self-diagnosis in the embodiment. An operation is started from step d0 and in step d1, a latch is released. In step d2, it waits for the low-voltage detection circuit 54 to detect low voltage of the first low-voltage detection level Vth1 or less. When the low voltage is detected, the latch is set in step d3. When the latch is set, in step d4, first time longer than or equal to time necessary for serial communications with all the power devices 31, 32, 33 to make one round is set in the timer 45 and it waits for a lapse of that first time. When the low-voltage detection circuit 55 detects low voltage of the second low-voltage detection level Vth2 or less in step d5 before the first time set in the timer 45 has elapsed, in step d6, second time longer than the first time is set to the timer 45 and it waits for a lapse of that second time. When the low-voltage detection circuit 55 does not detect the low voltage of the second low-voltage detection level Vth2 or less in step d5, the operation returns to step d4 and it waits for a lapse of the first time. When it is judged that the first time has elapsed in step d4 or it is judged that the second time has elapsed in step d6, the latch is released in step d7 and the operation is ended in step d8.

Though it is constructed so that two reference levels of the first low-voltage detection level Vth1 and the second low-voltage detection level Vth2 are provided and time set to the latch is changed in two stages in the embodiment, it can also be constructed so that the time is changed in further multiple stages or the time is changed continuously. Also; the time set to the latch can be changed according to a drop speed rather than a level of the power source voltage.

Though the plural power devices 31, 32, 33 are connected to the control apparatus 21, 41, 51 through the communication line 13 to constitute the electronic control systems 20, 40, 50 in the description mentioned above, the invention can similarly be applied to the case of connecting other electronic devices to constitute an electronic control system. In order to improve reliability of data, the invention can be applied also to an electronic control system for sequentially sending various data detected by a sensor as well as data of a self-diagnostic result as data sent from each electronic device by serial communication.

Though an abnormal drop in power source voltage detected by the low-voltage detection circuits 24, 54, 55 which are one of disturbance detection means is given as a factor in ignoring data, when there is a possibility that abnormal data is sent in case that a surge in thunder, an abnormal rise in power source voltage or mixing of excessive pulse noise occurs, a detection circuit for detecting this is provided and by this detection circuit, data is ignored for a predetermined period. Thereby, reliability can be improved. As a disturbance factor which makes data abnormal, a mechanical shock, a sudden change in temperature or humidity as well as a change in power source voltage can also be targeted for detection according to environment in which an electronic control system is placed. Though setting of the counter 26 or the timer 45 is made at a point in time of a drop in power source voltage, it can also be constructed so as to make the setting at a point in time of recovery from abnormal. This is applicable for a case in which an abnormal state continues long.

As described above, according to the invention, when a disturbance factor is detected, for a period set corresponding to a period necessary to receive data by serial communication from plural electronic devices, data in which there is a possibility that an abnormal operation occurs is ignored properly and the data can be used with high reliability. Detection of the disturbance factor can be performed in common with each of the electronic devices.

Also, according to the invention, an operation for ignoring data with low reliability can be performed surely.

Also, according to the invention, an operation for ignoring data with low reliability can be performed by a simple determination on whether or not time has elapsed.

Also, according to the invention, a period for which data is ignored can be set properly according to the extent of disturbance.

Further, according to the invention, when a drop in power source voltage is detected, data of a self-diagnostic result from plural electronic devices is ignored for a period set corresponding to a period necessary for serial communication, so that only data of the self-diagnostic result with high reliability can be used.

What is claimed is:

1. A control apparatus to which a plurality of electronic devices are connected via a communication line and data sent from each of the electronic devices is received by serial communication, comprising:
    a counter for counting a number of the data received by the serial communication from the electronic devices;
    a disturbance detection part for detecting a disturbance factor presumed to cause an abnormal operation in at least one of the electronic devices; and
    a data processing part for ignoring data from the electronic devices for a period of time when the disturbance detection part detects the disturbance factor until the counter counts a correct number of the data.

2. A control apparatus as claimed in claim 1, wherein a completion of a predetermined number of serial communications is set as the number of the data, the predetermined number corresponds to the number of electronic devices connected via the communication line.

3. A control apparatus as claimed in claim 1, wherein the correct number of the data is set as a number of all the electronic devices connected via the communication line.

4. A control apparatus as claimed in claim 3, wherein the counter prolongs the time in accordance with an increase of the disturbance factor detected by the disturbance detection part.

5. A self-diagnostic method for an electronic control system including a control apparatus and a plurality of electronic devices connected to the control apparatus via a communication line and sending data that indicates a self-diagnostic result thereof to the control apparatus by serial communication, the method comprising:
    counting a number of the data;
    detecting a drop in power source voltage; and
    ignoring the data that indicates a self-diagnostic result for a preset period of time corresponding to a time necessary for serial communications from the electronic devices to the control apparatus.

* * * * *